US009390448B2

(12) United States Patent
Chien et al.

(10) Patent No.: US 9,390,448 B2
(45) Date of Patent: Jul. 12, 2016

(54) SYSTEM AND METHODS TO PRESENT A PERSONAL SHOPPING EXPERIENCE

(71) Applicant: eBay Inc., San Jose, CA (US)

(72) Inventors: Hsin-Yi Chien, Cupertino, CA (US); Matthew Bret MacLaurin, Santa Cruz, CA (US); Marie Jeanette Floyd Tahir, San Jose, CA (US); Healey Cypher, San Francisco, CA (US); Ori Hanegby, Sunnyvale, CA (US); Weidong Zhang, Cupertino, CA (US); Dan A. Oron, Sunnyvale, CA (US); James Ross Skorupski, San Jose, CA (US); Jesse Wolfe, Sammamish, WA (US); Tejaswini Ravindra, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 690 days.

(21) Appl. No.: 13/765,558

(22) Filed: Feb. 12, 2013

(65) Prior Publication Data

US 2013/0311328 A1 Nov. 21, 2013

Related U.S. Application Data

(60) Provisional application No. 61/647,375, filed on May 15, 2012, provisional application No. 61/732,262, filed on Nov. 30, 2012.

(51) Int. Cl.
*G06Q 30/00* (2012.01)
*G06Q 30/06* (2012.01)
*G06Q 30/02* (2012.01)

(52) U.S. Cl.
CPC ........ *G06Q 30/0639* (2013.01); *G06Q 30/0207* (2013.01)

(58) Field of Classification Search
CPC .................................................. G06Q 30/0639
USPC ........................................................ 705/26.9
See application file for complete search history.

(56) References Cited

U.S. PATENT DOCUMENTS 6,954,735 B1 * 10/2005 Djupsjobacka ........ G06Q 30/06
701/533
7,263,500 B2 * 8/2007 Deal .................. G06Q 30/0639
705/26.9

(Continued)

FOREIGN PATENT DOCUMENTS

WO WO-00/051050 A1 * 8/2000
WO WO-2013173462 A1 11/2013

OTHER PUBLICATIONS

"Australian Application Serial No. 2013262848, First Examiner Report mailed Jul. 22, 2015," 3 pages.*

(Continued)

*Primary Examiner* — Nicholas D Rosen
(74) *Attorney, Agent, or Firm* — Schwegman, Lundberg & Woessner, P.A.

(57) ABSTRACT

A method and a system to present a personal shopping experience are provided. A plurality of items assigned to a category inputted by a user is identified. The plurality of items is available for sale at a plurality of corresponding locations within a pre-defined geographical area. A selection of at least one item of the plurality of items, the category, or a region within the pre-defined geographical area is received from a user. A path from a first location corresponding to a first item of the plurality of items to a second location corresponding to a second item of the plurality of items is determined. The path is within the pre-defined geographical area where the system is located. Discount information for the first item and discount information for the second item are identified. A path from the first location to the second location is displayed to the user. Discount information for the first item and the second item are provided to the user.

20 Claims, 18 Drawing Sheets

(56) References Cited

U.S. PATENT DOCUMENTS

| | | | | |
|---|---|---|---|---|
| 8,032,427 B1* | 10/2011 | Spreen | ............... | G06Q 30/02 |
| | | | | 705/14.49 |
| 8,321,292 B2* | 11/2012 | Fiorentino | ............ | G06Q 30/02 |
| | | | | 235/383 |
| 8,639,440 B2* | 1/2014 | Nicholson | ............ | G01C 21/00 |
| | | | | 701/400 |
| 9,064,277 B2* | 6/2015 | Wong | ............... | G06Q 30/06 |
| 9,117,238 B2* | 8/2015 | Tapley | ............... | G06Q 30/0641 |
| 9,129,332 B1* | 9/2015 | Oakes, III | ......... | G06Q 30/0639 |
| 9,141,987 B2* | 9/2015 | Perks | ............... | G06Q 30/0631 |
| 2001/0003099 A1 | 6/2001 | Von Kohorn | | |
| 2001/0047306 A1* | 11/2001 | Garretson | ............ | G06Q 10/087 |
| | | | | 705/20 |
| 2002/0069131 A1* | 6/2002 | Miyata | ............... | G06Q 10/06 |
| | | | | 705/26.9 |
| 2004/0162765 A1* | 8/2004 | Reber | ............... | G06Q 30/0639 |
| | | | | 705/26.9 |
| 2005/0044011 A1* | 2/2005 | Deal | ............... | G06Q 30/0639 |
| | | | | 705/26.9 |
| 2010/0179885 A1* | 7/2010 | Fiorentino | ............ | G06Q 30/02 |
| | | | | 705/26.1 |
| 2011/0022424 A1* | 1/2011 | VonDerheide | ......... | G01C 21/20 |
| | | | | 705/5 |
| 2011/0022468 A1 | 1/2011 | Muster et al. | | |
| 2011/0246064 A1* | 10/2011 | Nicholson | ............ | G01C 21/00 |
| | | | | 701/467 |
| 2012/0059584 A1 | 3/2012 | Nesbitt et al. | | |
| 2012/0066035 A1 | 3/2012 | Stanger et al. | | |
| 2012/0123673 A1* | 5/2012 | Perks | ............... | G06Q 30/0631 |
| | | | | 701/426 |
| 2012/0316989 A1* | 12/2012 | Wong | ............... | G06Q 30/06 |
| | | | | 705/26.9 |
| 2013/0226731 A1* | 8/2013 | MacNeille | ............ | G06Q 10/00 |
| | | | | 705/26.8 |
| 2013/0253832 A1* | 9/2013 | Nallu | ............... | G06Q 30/0633 |
| | | | | 701/537 |
| 2013/0282520 A1* | 10/2013 | Tapley | ............ | G06Q 30/0641 |
| | | | | 705/26.8 |
| 2014/0006159 A1* | 1/2014 | Wissner-Gross | .. | G06Q 30/0261 |
| | | | | 705/14.57 |

OTHER PUBLICATIONS

"International Application Serial No. PCT/US2013/041153, International Search Report mailed Oct. 21, 2013", 2 pgs.

"International Application Serial No. PCT/US2013/041153, Written Opinion mailed Oct. 21, 2013", 8 pgs.

"Australian Application Serial No. 2013262848, Response filed Dec. 16, 2015 to Office Action mailed Jul. 22, 2015", 18 pgs.

"International Application Serial No. PCT/US2013/041153, International Preliminary Report on Patentability mailed Nov. 27, 2014", 10 pgs.

* cited by examiner

SYSTEM AND METHODS TO PRESENT A PERSONAL SHOPPING EXPERIENCE

RELATED APPLICATIONS

This application claims the priority benefit of U.S. Provisional Application No. 61/647,375, filed May 15, 2012, which is incorporated herein by reference in its entirety and U.S. Provisional Application No. 61/732,262, filed Nov. 30, 2012, which is incorporated herein by reference in its entirety.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2012, All Rights Reserved.

TECHNICAL FIELD

The present application relates generally to the technical field of data processing and, in one specific example, to present a personal shopping experience to a user.

BACKGROUND

An information stand may present shopping information to a user to facilitate a shopping experience for the user. The information may include a diagram depicting a layout of the mall and locations of stores within the mall. The information may also indicate a location of the information stand in relation to the stores within the mall.

BRIEF DESCRIPTION OF THE DRAWINGS

Some embodiments are illustrated by way of example and not limitation in the figures of the accompanying drawings in which.

DETAILED DESCRIPTION

Example methods and systems to provide a personal shopping experience are described. In the following description, for purposes of explanation, numerous specific details are set forth in order to provide a thorough understanding of example embodiments. It will be evident however, to one skilled in the art that the present invention may be practiced without these specific details.

When a consumer shops at a mall, the consumer may access a mall kiosk and indicate a category of items of interest to the consumer. In response, the mall kiosk may present a list of mall items located in the mall to the consumer. The list of items may also be categorized into various categories. At the mall kiosk, the shopper may make a selection of items from the list of items. Once the selection is made, the mall kiosk may present to the shopper a diagram of the mall. The diagram may include a path from one item selected by the user to another item selected by the user. The mall kiosk may also provide to the shopper discounts for the items selected by the shopper.

In various embodiments, the shopper may interact with the mall kiosk using a mobile device. The shopper may indicate an item preference using the mobile device. The mall kiosk may also provide the discounts to the mobile device of the shopper. In various embodiments, the mall kiosk may display a promotional code to the shopper to be used at a store within the mall. In various embodiments, the mall kiosk may send a coupon to a store within the mall to be redeemed by the shopper.

Figure 1:
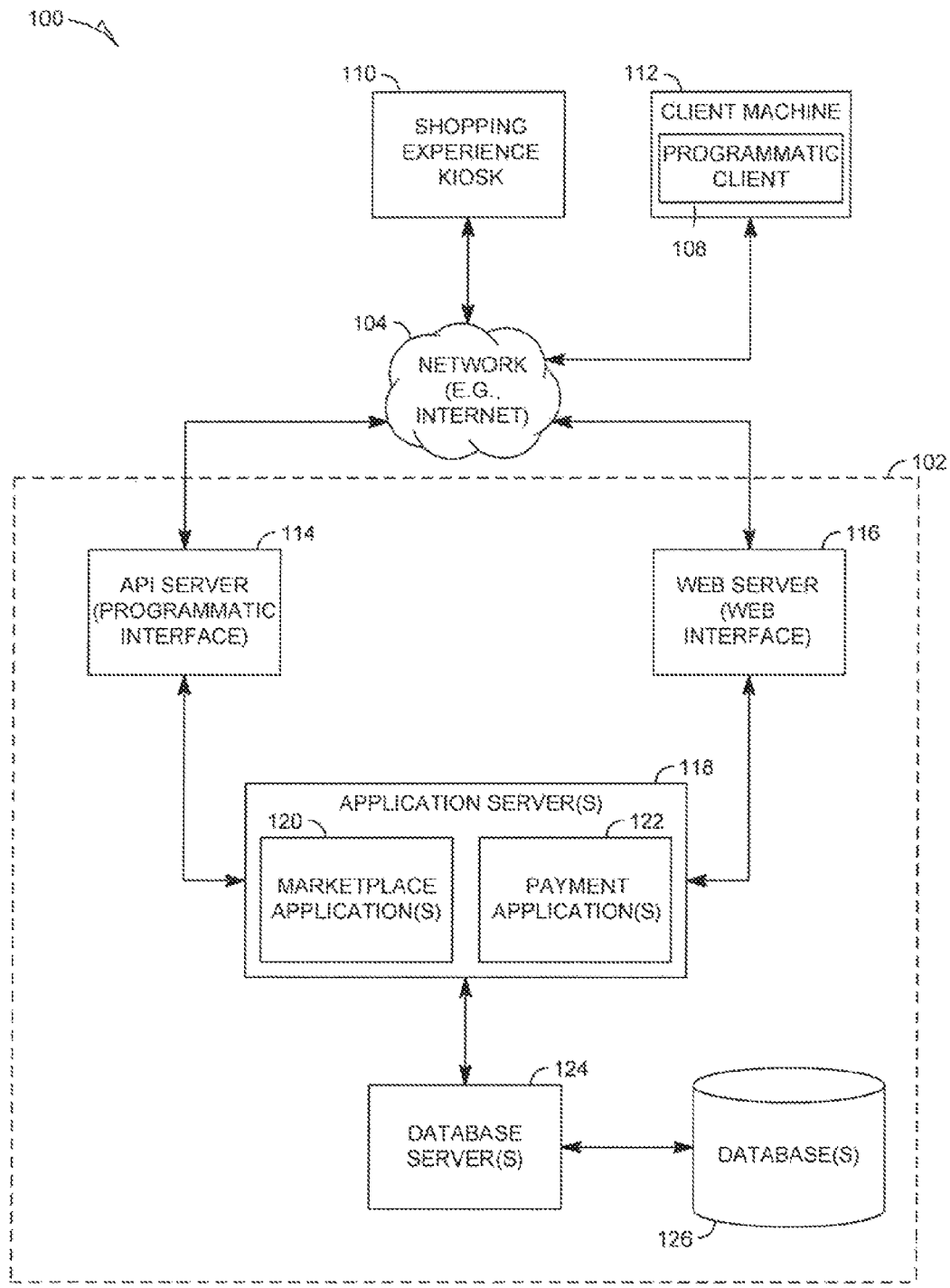
FIG. 1 is an example network diagram of an environment where various embodiments may be implemented.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a programmatic client 108 executing on client machine 112. FIG. 1 also illustrates, for example, a shopping experience kiosk 110 in communication with the network 104. The shopping experience kiosk 110 may be a mall kiosk that exists within a shopping area and provides a shopper with a personalized shopping experience. The shopping experience kiosk 110 may comprise a display that presents information to the shopper. The shopper may also interact with the shopping experience kiosk 110 via the display.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shows in FIG. 1 employs a client-server architecture, the present invention is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
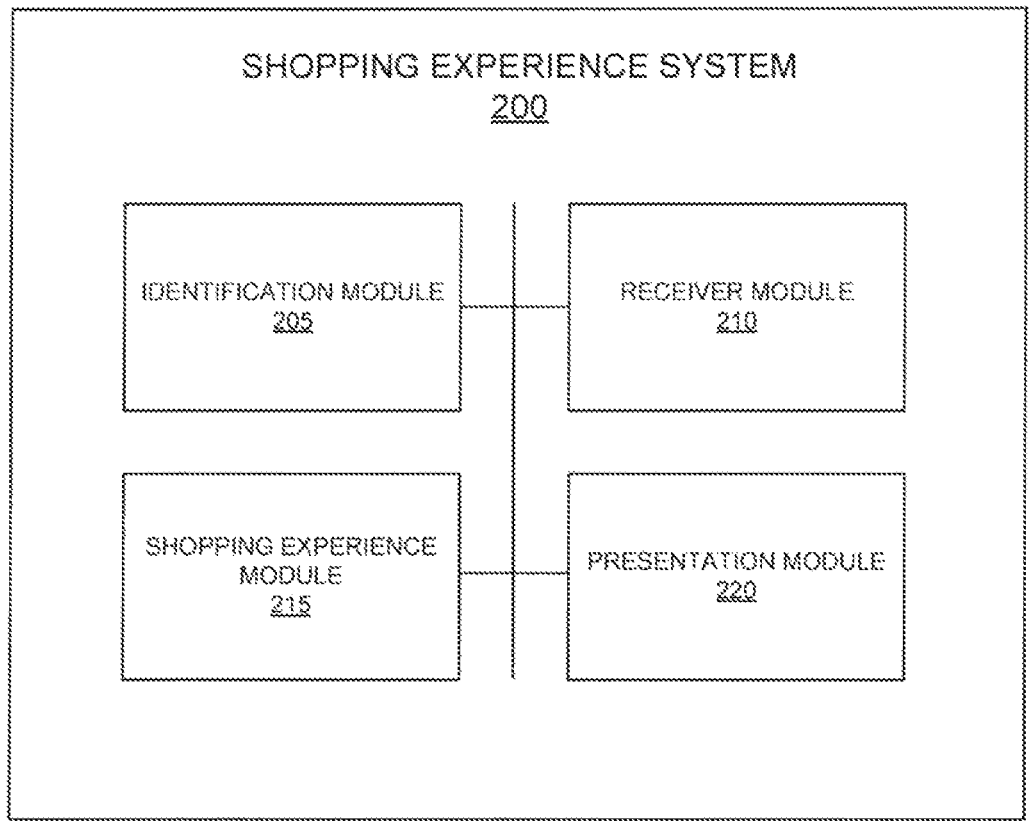
FIG. 2 is a block diagram of a shopping experience system, according to various embodiments.

FIG. 2 is a block diagram of a shopping experience system 200, according to various embodiments. The system 200 may be implemented as hardware or as software executed by hardware (e.g., by one or more processors) comprises an identification module 205, a receiver module 210, a shopping experience module 215, and a presentation module 220. Various modules of the shopping experience system may exist at a mall kiosk such as the shopping experience kiosk 110. Alternatively, various modules of the shopping experience system 200 may exist on a server apart from the shopping experience kiosk 110.

In various embodiments, the identification module 205 is configured to identify a plurality of items assigned to a category indicated by a shopper. In various embodiments, each of the plurality of items is available for sale within a pre-defined geographical area at one of a plurality of bricks-and-mortar stores. In various embodiments, the pre-defined geographical area may be a shopping area such as a mall. The mall may be an indoor shopping area or an outdoor shopping area and may comprise of various briefs-and-mortar stores or showcases. In various embodiments, the shopping area may also include other briefs-and-mortar stores or showcases surrounding the shopping area, such as a grocery store, a pharmacy, a restaurant, and the like. The identification module 205 may identify the plurality of items by accessing a database that stores item information. In an alternative embodiment, the identification module 205 may identify the plurality of items by communicating with the application servers 118 over the network 104. In various embodiments, the identification module 205 may identify the plurality of items based in part on a user profile corresponding to the shopper. As an example, the shopper may have an online eBay™ account. The eBay™ account include user shopping behavior, such as previous transactions made by the shopper. In some embodiments, the identification module 205 may exist at the shopping experience kiosk 110 or at an application server 118.

In various embodiments, once identified, the plurality of items may be displayed as a list of items at the shopping experience kiosk 110, Alternatively, a description of the plurality of items may be sent to a client machine 112 of a shopper. The description of the plurality of items may be sent as an email and may be accessed by the client machine 112. Alternatively, the description of the plurality of items may be accessed by a programmatic client 108 on the client machine 112.

In various embodiments, the receiver module 210 is configured to receive a selection, from the shopper, of at least one item from the plurality of items. In various embodiments, the receiver module 210 may exist at the shopping experience kiosk 110 or may be in communication with the client machine 112. Alternatively, the receiver module 310 may exist at the application server 118. In various embodiments, the shopper may indicate the selection using a client machine 112. The shopper may interact with the client machine 112 and after the selection is complete, the selection is sent from the client machine 112 to the receiver module 210. The selection may be sent over a network to the server. Alternatively, the selection may be sent to the shopping experience kiosk 110. In various embodiments, the shopper may indicate the selection by interacting with the list of items displayed at the shopping experience kiosk 110. The shopping experience kiosk 110 may comprise a touch sensitive display that may receive a touch as an input. As such, the shopper may touch a region on the display that corresponds to an item from the list of items to indicate the selection.

In various embodiments, the receiver module 210 is configured to receive an indication of a category of items from the shopper. The shopper may have a preference for a group of items belonging to the category indicated by the shopper. In various embodiments, the category may be indicated using a client machine 112. The shopper may textually input a category on the client machine 112 and then send the category to the receiver module 210. In various embodiments, the shopper may indicate the category by interacting with a list of categories displayed at the shopping experience kiosk 110.

The shopper may touch a region on the display that corresponds to the category from the list of categories. In various embodiments, the receiver 210 may receive an indication of a plurality of categories from the shopper.

In various embodiments, the receiver module 210 is configured to receive a selection of a region from the shopper. The region selected may be within the shopping area. For example, the shopper may select the second floor of the shopping area. As another example, the shopper may select the left wing of the shopping area. In various embodiments, the shopper may select the region using a client machine 112. The client machine 112 may include a map of the shopping area and the user may select a region on the map. The selected region is then sent from the client machine 112 to the receiver module 210. Alternatively, the map of the shopping area may be displayed at the shopping experience kiosk 110. The shopper may indicate a region by touching a portion of the map of the shopping area. For example, the shopper may select the left wing of the shopping area by touching an area of the map corresponding to the left wing of the shopping area.

In various embodiments, the shopping experience module 215 is configured to determine a path between various locations within the shopping area. In various embodiments, the path may be from a location of a first item to a location of a second item. The shopping experience module 215 may determine the first item based on the information received at the receiver module 210. The shopping experience module 215 may also determine the second item based on the information received at the receiver module 210. As mentioned previously, the receiver module 205 may receive the selection of at least one item, an indication of a category, or the selection of the region within the shopping area. As an example, if the shopper indicates sporting gear as a category, then the first item may be a basketball and the second item may be a baseball glove. As another example, if the shopper selects the second floor of the shopping area as a region, then the first item will be located on the second floor of the shopping area and the second item will be located on the second floor of the shopping area. The location of an item may be indicated by a retail store where the item is sold a geographical coordinate within the pre-defined geographical area, a region on the diagram of the shopping area, and the like. In various embodiments, the path determined may be the least distance between the location of the first item and the location of the second item. In various embodiments, the path determined may include locations for additional items. The path may also include a location of the shopping experience kiosk 110. In various embodiments, the path may be within the pre-defined geographical area, or the shopping area. In various embodiments, the shopping experience module 215 may determine the first item based in part on a user profile for the shopper. The shopping experience module 215 may also determine the second item based in part on the user profile for the shopper. The user profile for the shopper may be an online account, such as an eBay™ account that includes user shopping behavior. In various embodiments, the user shopping behavior may indicate previous transactions completed by the shopper. The previous transactions may be for items available in the shopping area. Alternatively, the previous transactions may relate to items available in the shopping area. In various embodiments, the user shopping behavior may be stored in one or more database(s) 126 of FIG. 1. In various embodiments, the user profile for the shopper may be used to identify discount information.

In various embodiments, the shopping experience module 215 is further configured to identify discount information for the first item and discount information for the second item.

Discount information may provide the shopper with an option to purchase an item for a reduced price. In various embodiments, the option to purchase the item for a reduced price may expire alter a predetermined period of time. In various embodiments, the price reduction may also increase if more shoppers use the discount information to purchase the item. Discount information may include a deal, a coupon, a flash sale, a group discount, a promotional code, and the like. In various embodiments, the shopping experience module 215 may provide daily deals to the shopper. The daily deals may pertain to a plurality of items for sale in the shopping area and may expire after a predetermined period of time.

In various embodiments, the presentation module 220 is configured to display the path from the first item to the second item. In various embodiments, the presentation module 220 exists at the shopping experience kiosk 110. In various embodiments, the path may be displayed at the shopping experience kiosk 110 as a path within the diagram of the shopping area. In various embodiments, a description of the path may be sent to the client machine 112 of the shopper. The description of the path may include the geographical coordinates of the locations within the path. The discount information may be displayed at the shopping experience kiosk 110. Alternatively, the discount information may be sent to the client machine 112 of the shopper. The shopping experience kiosk 110 may display an image of a code that the client machine 112 scans in order to send and receive information. In various embodiments, the discount information may be sent to a retail location where the discount may be applied. For example, discount information for the first item may be sent to a retail location where the first item is sold. In various embodiments, discount information may be displayed to the shopper as a promotional code to be used at a retail location in the shopping area. In various embodiments, the discount information may also be displayed as part of the path. For instance, the discount information for the first item may be displayed on the path next to the location of the first item. Moreover, the discount information for the second item may be displayed on the path next to the location of the second item.

Figure 3:
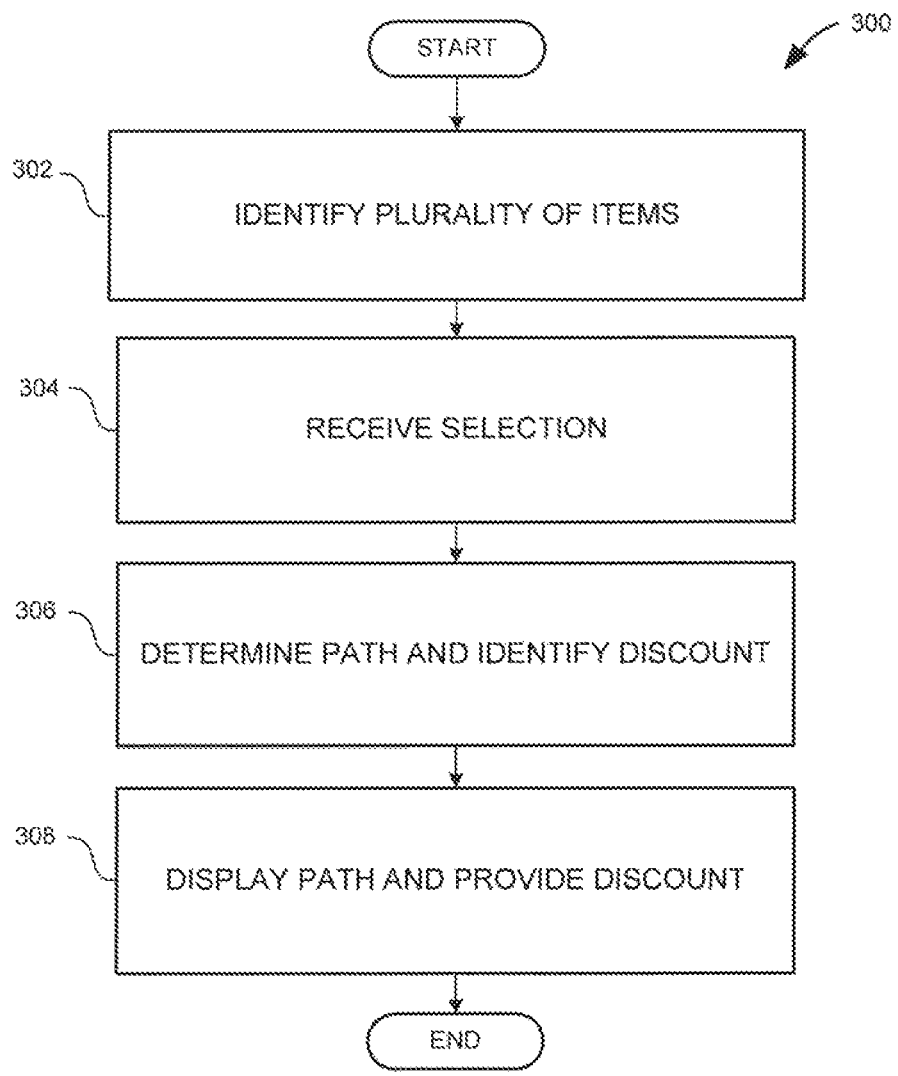
FIG. 3 is a flowchart of a method to provide a discount and display a path, according to various embodiments.

FIG. 3 is a flowchart of a method 300 to provide a discount and display a path, according to various embodiments. The method 300 begins at step 302 when the identification module 205 identifies a plurality of items assigned to a category inputted by a user. The various embodiments, the plurality of items are available for sale at a plurality of corresponding locations within a pre-defined geographical area. At step 304, the receiver module 210 receives a selection of at least one item of the plurality of items, the category, or a region within the pre-defined geographical area from the user. At step 306, the shopping experience module 215 determines a path from a first location corresponding to a first item of the plurality of items to a second location corresponding to a second item of the plurality of items. In various embodiments, the path is within the pre-defined geographical area where the system is located. At step 306, the shopping experience module 215 identifies discount information for the first item and discount information for the second item. At step 308, the presentation module 220 displays a path from the first location to the second location to the user. At step 308, the presentation module 220 provides discount information for the first item and discount information for the second item to the user. In various embodiments, the presentation module 220 is located within the pre-defined geographical area.

Figure 4:
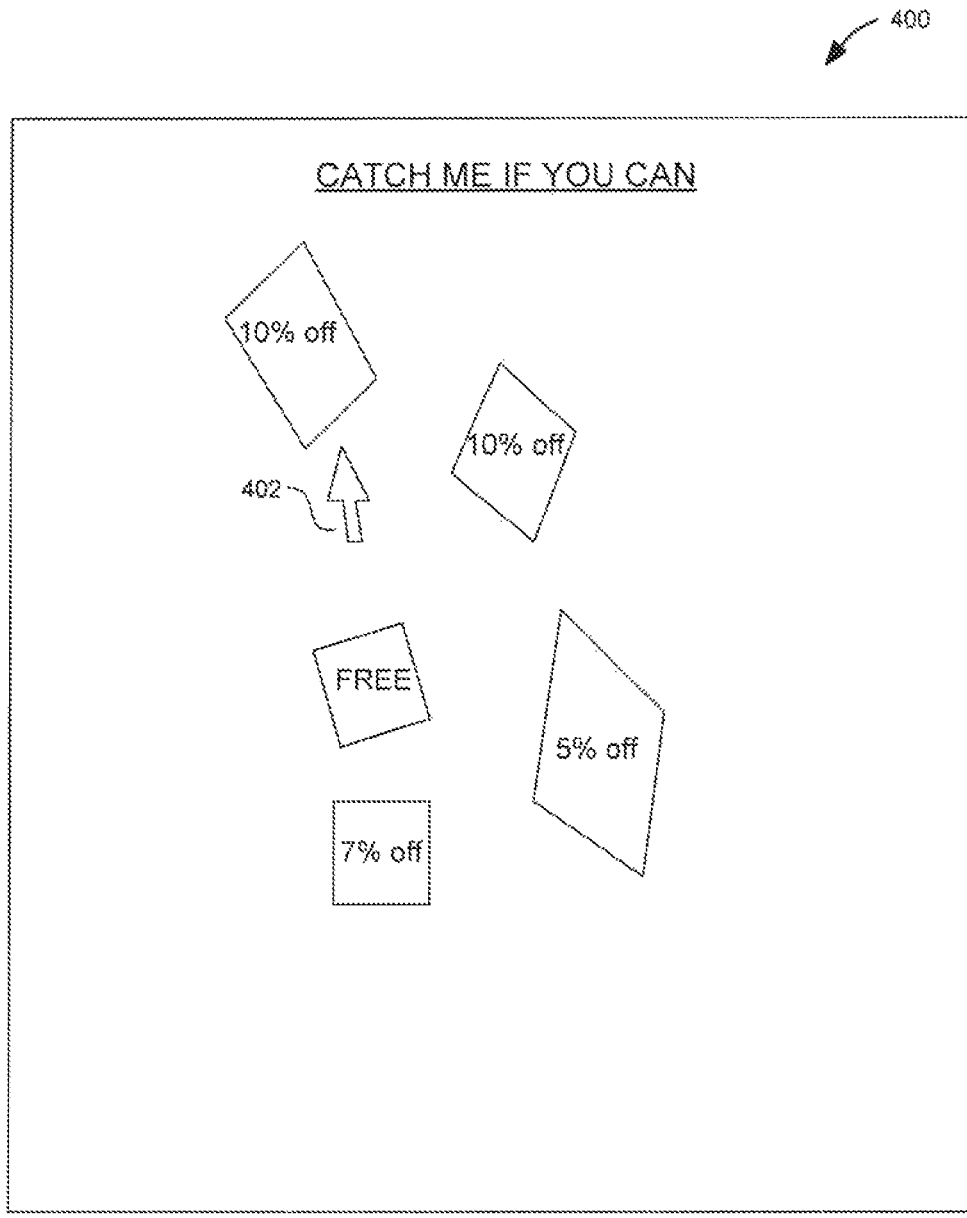
FIG. 4 is a portion of a user interface depicting a cursor interacting with a plurality of coupons, according to various embodiments.

FIG. 4 is a portion of a user interface 400 depicting a cursor interacting with a plurality of coupons, according to various embodiments. The cursor 402 may be controlled by a shopper in order to select a coupon from the plurality of coupons. As depicted in FIG. 4, the coupons are rapidly moving across the display from top to bottom. The shopper may select a coupon from the moving coupons. After a pre-determined period of time, the coupons may no longer be displayed and the user is provided the selected coupons.

Figure 5:
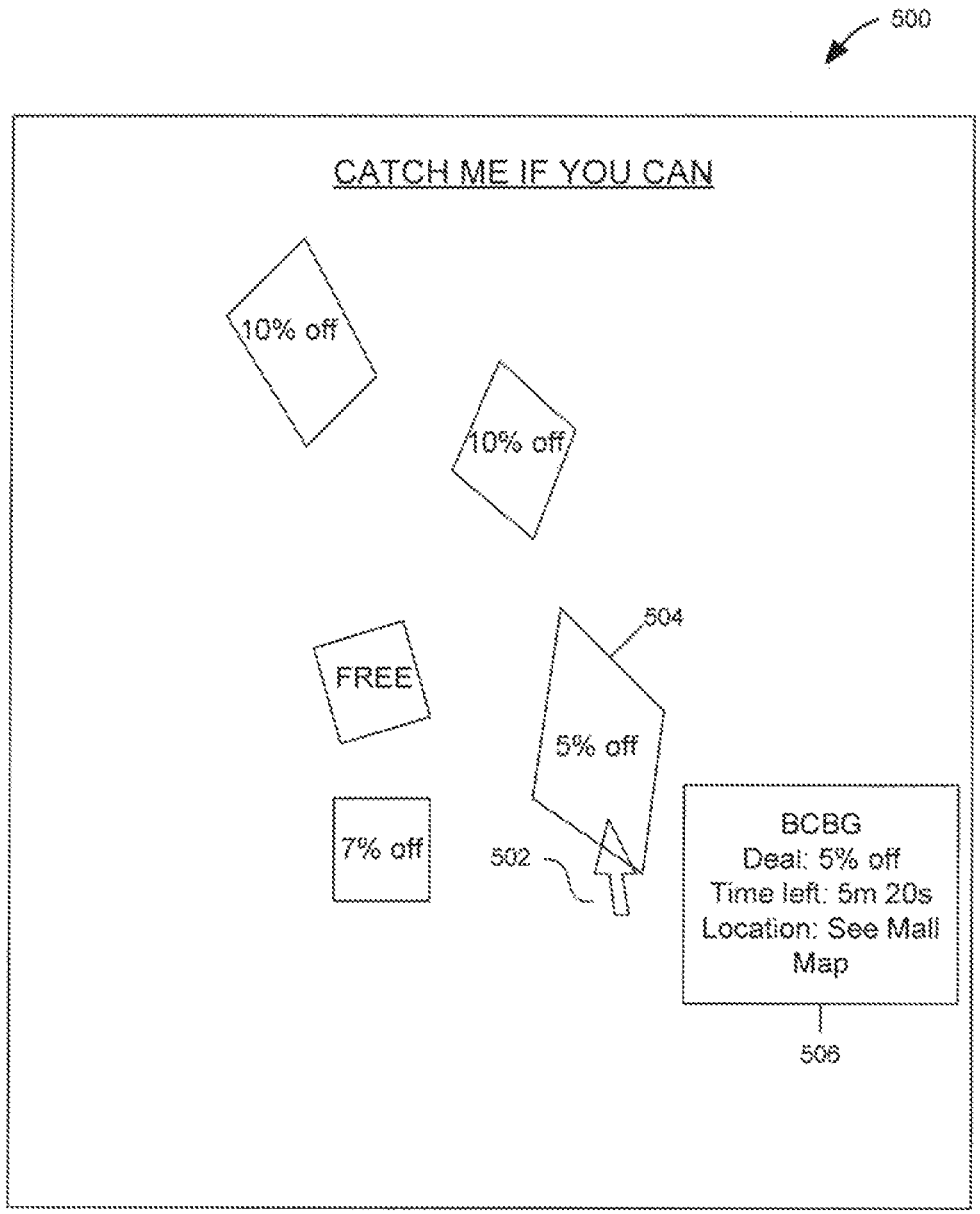
FIG. 5 is a portion of a user interface depicting a cursor scrolling over a coupon, according to various embodiments.

FIG. 5 is a portion of a user interface 500 depicting a cursor scrolling over a coupon, according to various embodiments. The cursor 502 may be controlled by a shopper in order to select a coupon from the plurality of coupons. The cursor 502 may scroll over a coupon 504 and information 506 regarding the coupon 504 may be displayed.

Figure 6:
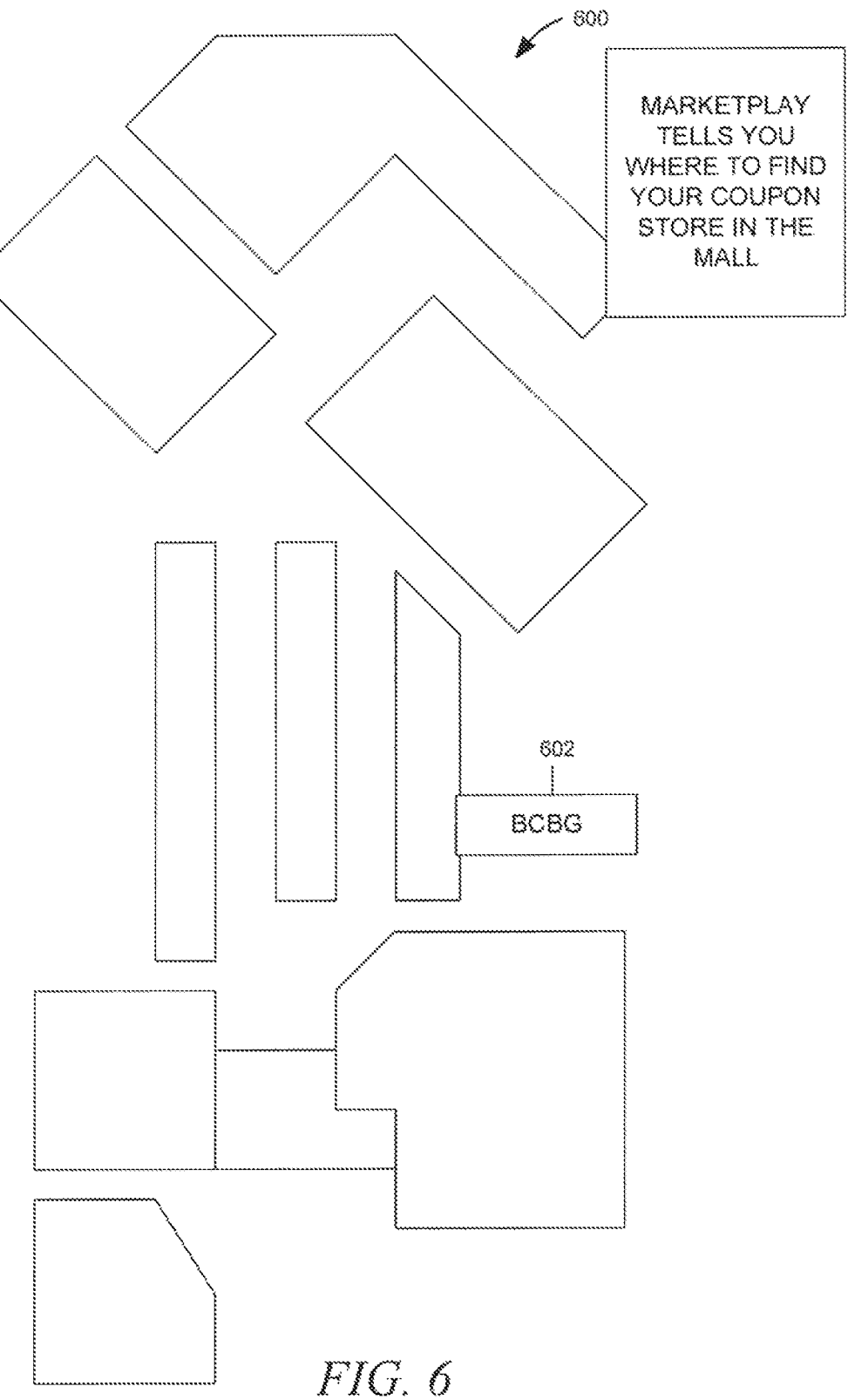
FIG. 6 is a portion of a user interface depicting a layout of a shopping area, according to various embodiments.

FIG. 6 is a portion of a user interface 600 depicting a layout of a shopping area, according to various embodiments. The layout of the shopping area may also tag 502 a retail location where an item is sold. In various embodiments, the coupon 504 from FIG. 5 may be used at the retail location.

Figure 7:
FIG. 7 is a portion of a user interface depicting a plurality of deals and an option to view more deals, according to various embodiments.

FIG. 7 is a portion of a user interface 700 depicting a plurality of deals and an option 702 to view more deals, according to various embodiments. The plurality of deals may correspond to a particular day. The shopper may exercise the option 702 to view more personalized deals. In various embodiments, the more personalized deals may be provided upon the shopper logging into a marketplace application 118. The shopper's profile is accessed and coupons are provided based on information contained therein.

Figure 8:
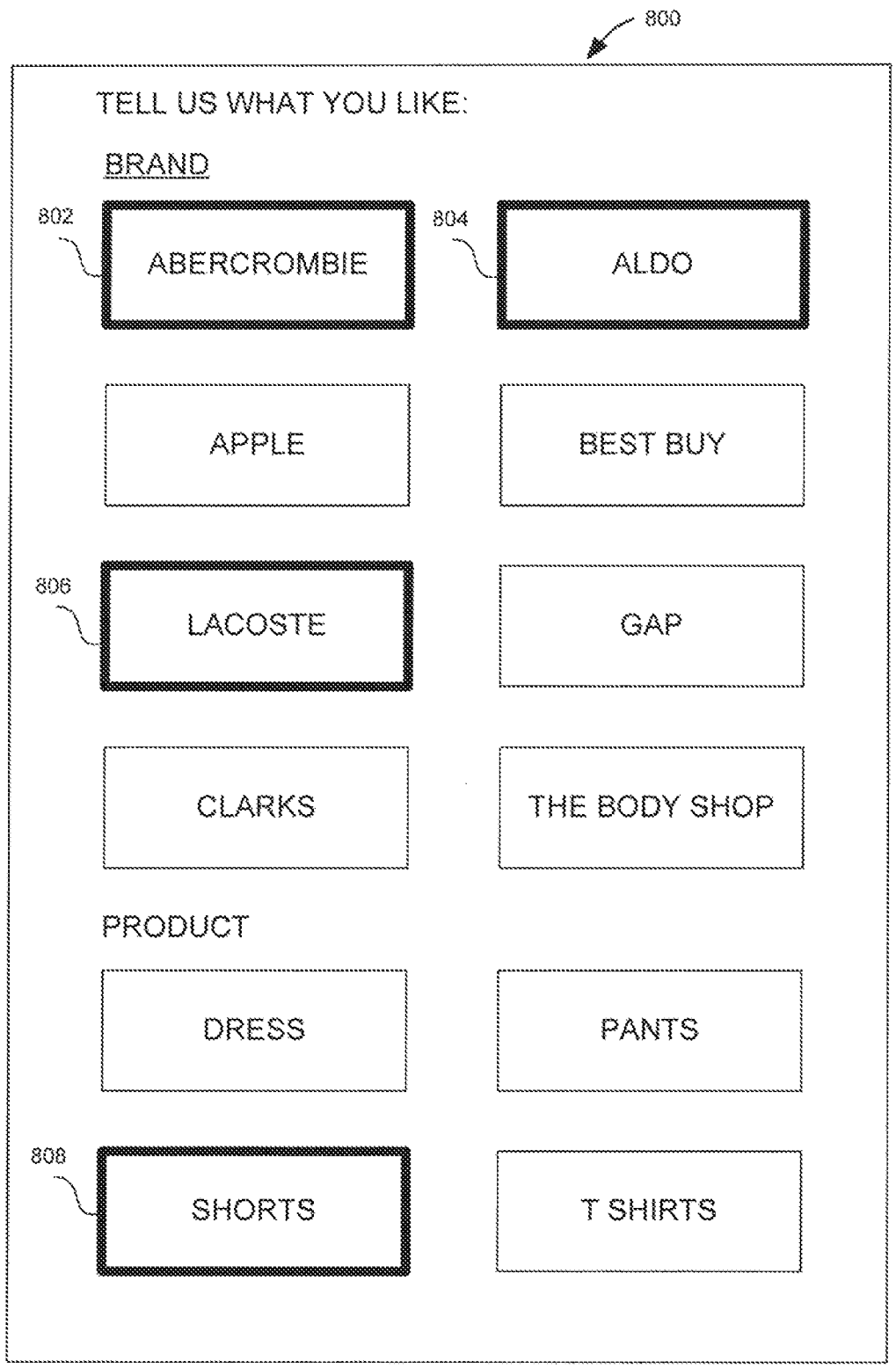
FIG. 8 is a portion of a user interface depicting a selection of brands and a selection of products, according to various embodiments.

FIG. 8 is a portion of a user interface 800 depicting a selection of brands and a selection of products, according to various embodiments. The shopper may select a plurality of brands as indicated by selection 802, selection 804, and selection 806. The shopper may also select a product from a plurality of products, as indicated by selection 808. The selection from the shopper may be used by the shopping experience module 215 to identify items of interest to the shopper.

Figure 9:
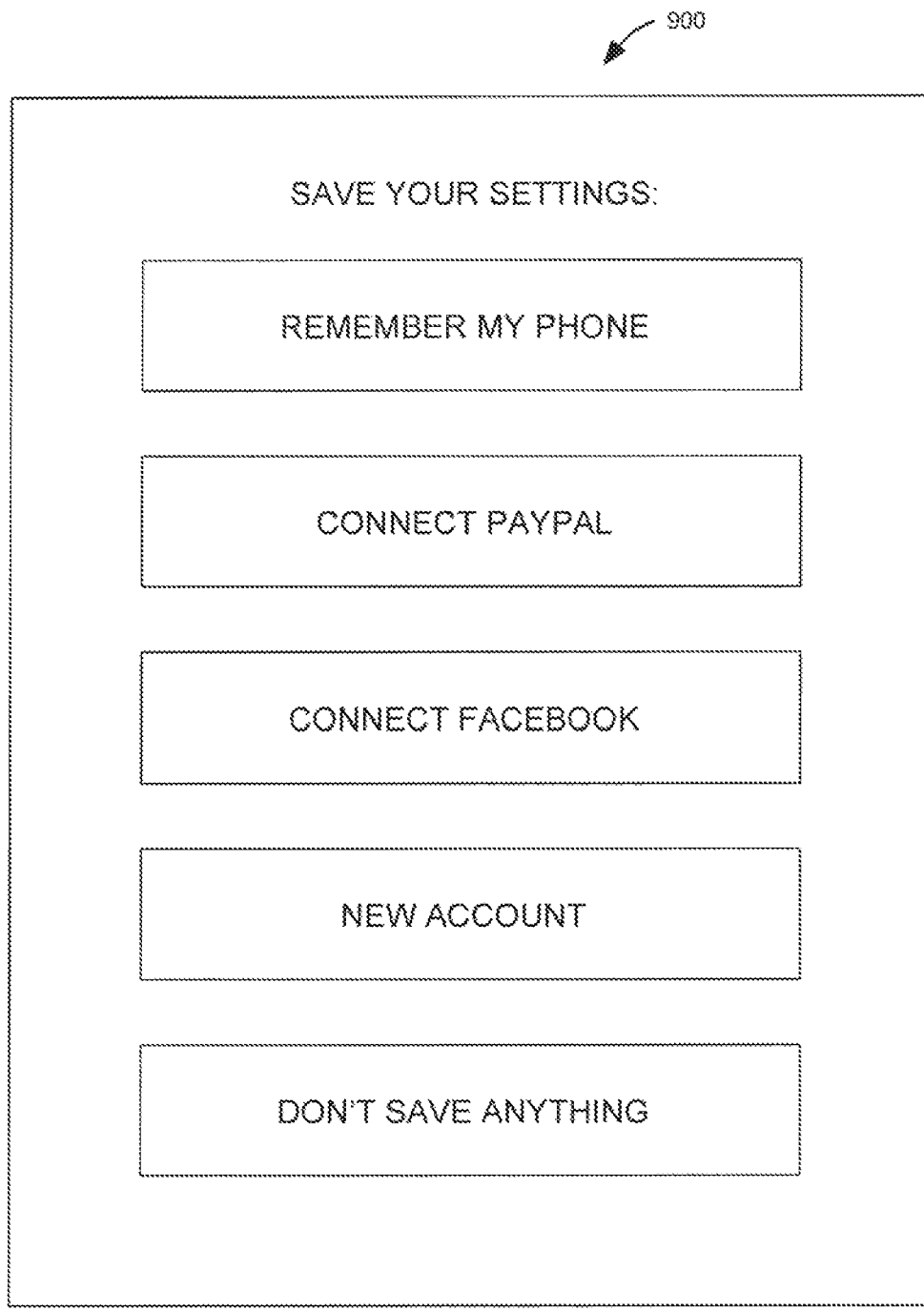
FIG. 9 is a portion of a user interface depicting an option to save information to a variety of destinations, according to various embodiments.

FIG. 9 is a portion of a user interface 900 depicting an option to save information to a variety of destinations, according to various embodiments. The information saved may be the selection of brands and products from the shopper depicted in FIG. 8. The destinations may include a phone, a payment account (e.g., a PAYPAL account), a social networking account (e.g., a FACEBOOK account), a new account, and the like. There may also be an option to not save the information.

Figure 10:
FIG. 10 is a portion of a user interface depicting a plurality of deals, according to various embodiments.

FIG. 10 is a portion of a user interface 1000 depicting a plurality of deals, according to various embodiments. The plurality of deals may be personalized to the shopper based on the selections made by the shopper in FIG. 8. For instance, deal 1002 for 10% off shorts at a particular store (e.g., Abercrombie) may be displayed in part due to selection 802 and selection 808 of FIG. 8.

Figure 11:
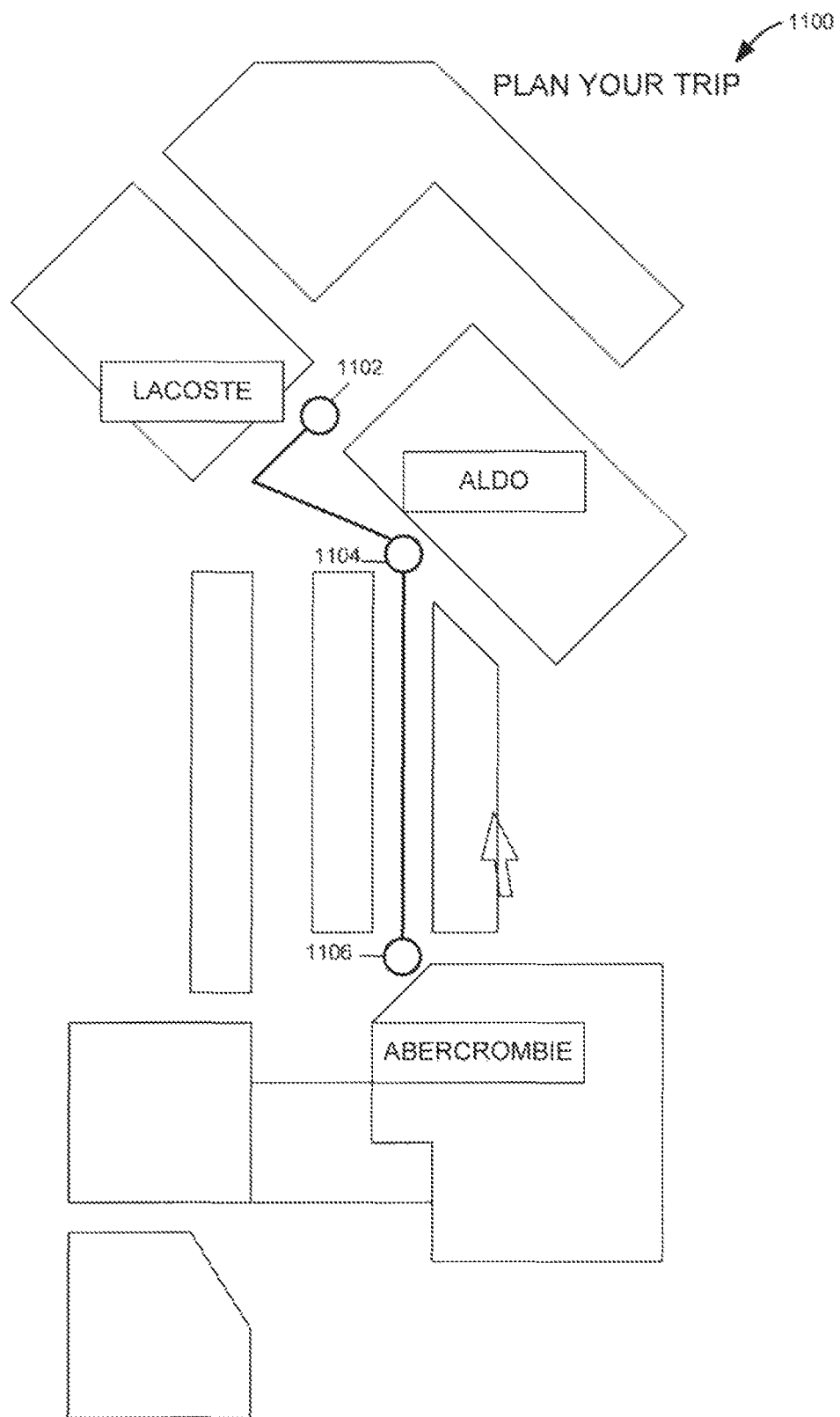
FIG. 11 is a portion of a user interface depicting a layout of the shopping area and a path within the shopping area, according to various embodiments.

FIG. 11 is a portion of a user interface 1100 depicting a layout of the shopping area and a path within the shopping area, according to various embodiments. The path may include locations where the deals featured in FIG. 10 may be used. For example, location 1102 may be where a particular store, Lacoste, is located. Location 1104 may be where another particular store, Aldo, is located. Location 1106 may be where a further store, Abercrombie, is located. Continuing the example of FIG. 10, deal 1002 of FIG. 1000 for 10% off shorts from Abercrombie may be used at location 1102.

Figure 12:
FIG. 12 is a portion of a user interface depicting an image used to transfer information to a mobile device, according to various embodiments.

FIG. 12 is a portion of a user interface 1200 depicting an image used to transfer information to a client machine 112, according to various embodiments. The coupon and/or the path may be transferred by scanning the image 1202 using a client machine 112. In various embodiments, after scanning the image 1202, the information is received by the client machine 112.

Figure 13:
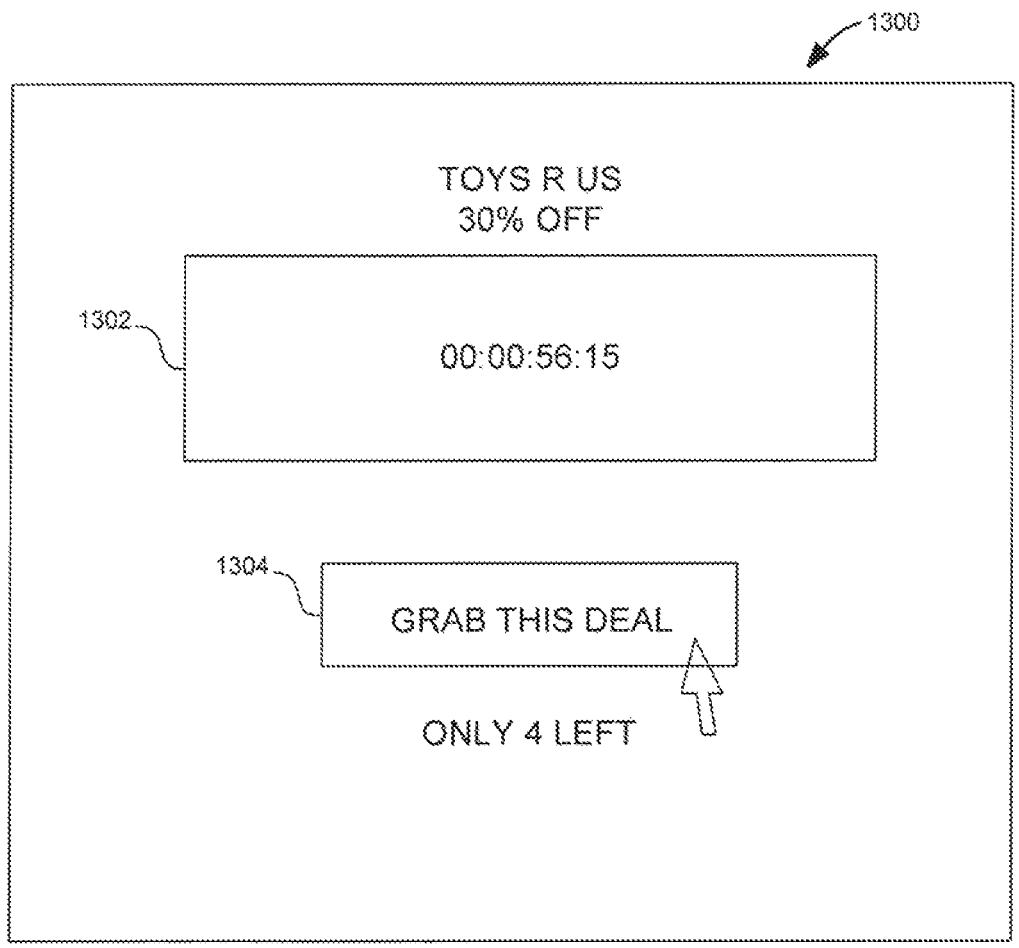
FIG. 13 is a portion of a user interface depicting an option to claim a deal before a predetermined period of time elapses, according to various embodiments.

FIG. 13 is a portion of a user interface 1300 depicting an option to claim a deal before a predetermined period of time elapses, according to various embodiments. The interface 1300 may display a countdown 1302 to when the deal expires. The shopper may exercise the option 1304 to claim the deal before it expires. In various embodiments, the deal may be determined based on accessing the shopper's profile. In various embodiments, the deal may be presented based on selections made by the shopper, such as the ones depicted in FIG. 8. In various embodiments, if the shopper does not exercise the option 1304 to claim the deal before it expires, then another deal may be presented to the user in a similar manner. Moreover, the expired deal may no longer be claimed by the shopper.

Figure 14:
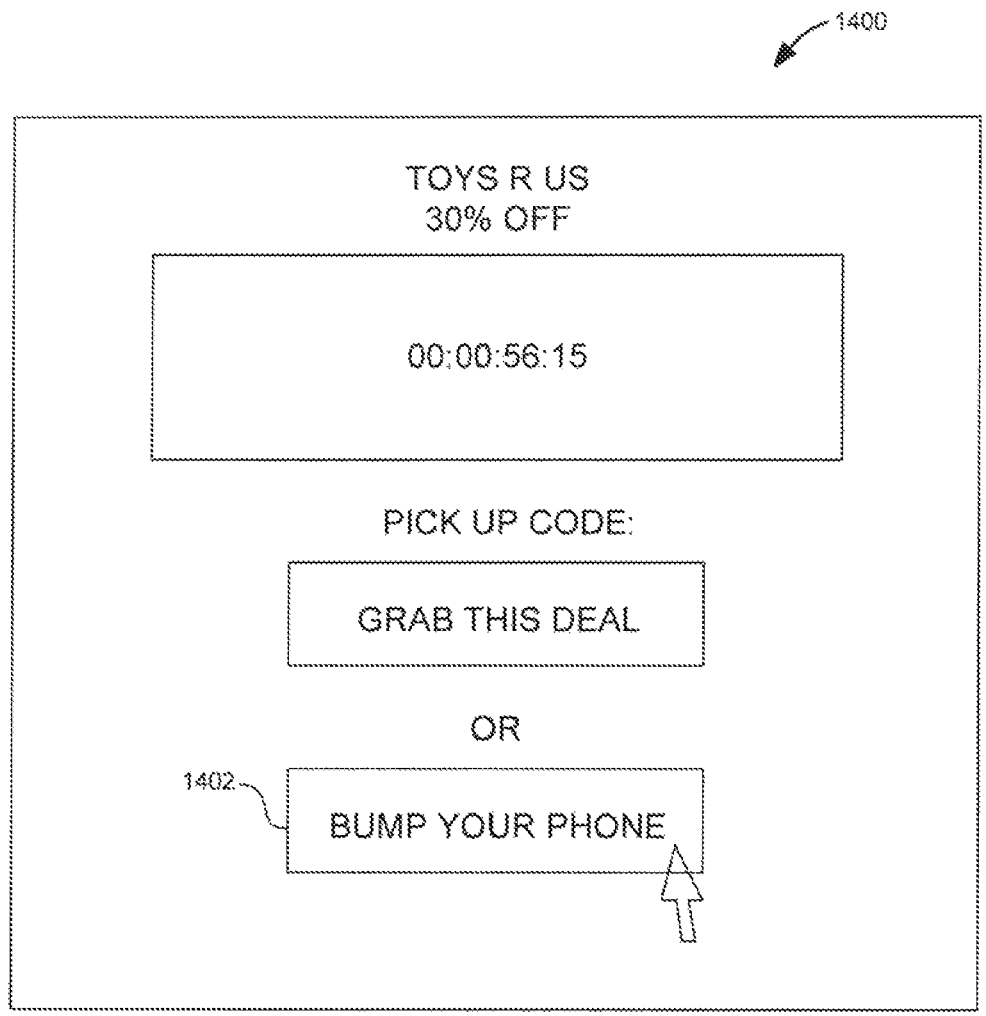
FIG. 14 is a portion of a user interface depicting an option to claim a deal using a mobile device, according to various embodiments.

FIG. 14 is a portion of a user interface 1400 depicting an option to claim a deal using a client machine 112, according to various embodiments. The interface 1400 may display a countdown to when the deal offer interface 1400 expires. The shopper may exercise the option to accept the deal or reject the deal. Upon receiving an acceptance or rejection of the deal the interface 1400 displays another deal that can be accepted or rejected by the user. Additional deals are shown to the user in sequence until the interface expires. The shopper may also exercise the option 1402 to use a client machine 112 to retrieve the deal, such as through a "bump." If user accepts or retrieves a deal, the deal appears as a coupon or coupon code redeemable by the user at a store in the shopping area. The deal may be redeemable at the store for a longer period of time, such as the remainder of the business day.

Figure 15:
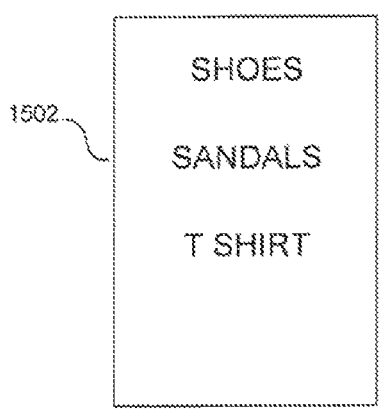
FIG. 15 is a block diagram illustrating three users interacting with a shopping experience kiosk 110 kiosk, according to various embodiments.
Figure 15:
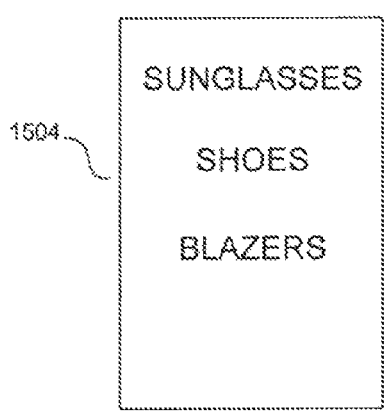
Figure 15:
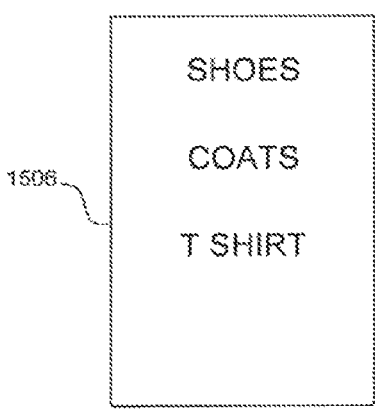

FIG. 15 is a block diagram 1500 illustrating three users interacting with a shopping experience kiosk 110, according to various embodiments. A first shopper may interact with the shopping experience kiosk 110 1508 using a client machine 1502 of the first shopper. A second shopper may interact with the shopping experience kiosk 110 1508 using a client machine 1504 of the second shopper. A third shopper may interact with the shopping experience kiosk 110 1508 using a client machine 1506 of the third shopper. The client machines 1502, 1504, and 1506 may each have a list of items reflecting the respective shopper's preferences. In various embodiments, the client machine 1502, 1504, and 1506 may have an item in common within their list of items. The shopping experience kiosk 110 1508 may receive the list of items from the client machines 1502, 1504, and 1506 and determine an item in common. As depicted in FIG. 15, all three client machines 1502, 1504, and 1506 have shoes listed as the item in common.

Figure 16:
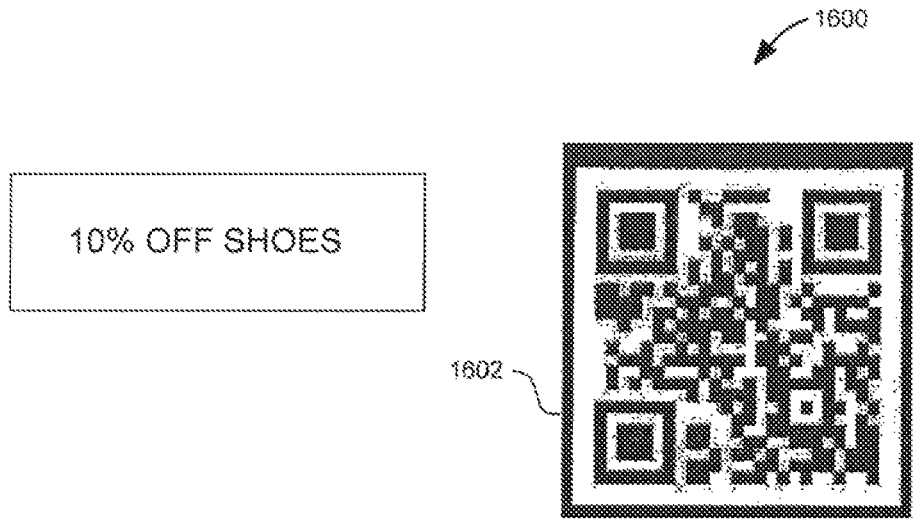
FIG. 16 is a portion of a user interface depicting an image used to transfer a coupon to a mobile device, according to various embodiments.

FIG. 16 is a portion of a user interface 1600 depicting an image used to transfer a coupon to a client machine 112, according to various embodiments. The coupon may be transferred by scanning the image 1602 using a client machine 112. In various embodiments, after scanning the image 1602, the coupon is received by the client machine 112. The image 1602 may be generated after the shopping experience kiosk 110 1508 of FIG. 15 determines the item in common among the three client machines 1502, 1504, and 1506 of FIG. 15.

Figure 17:
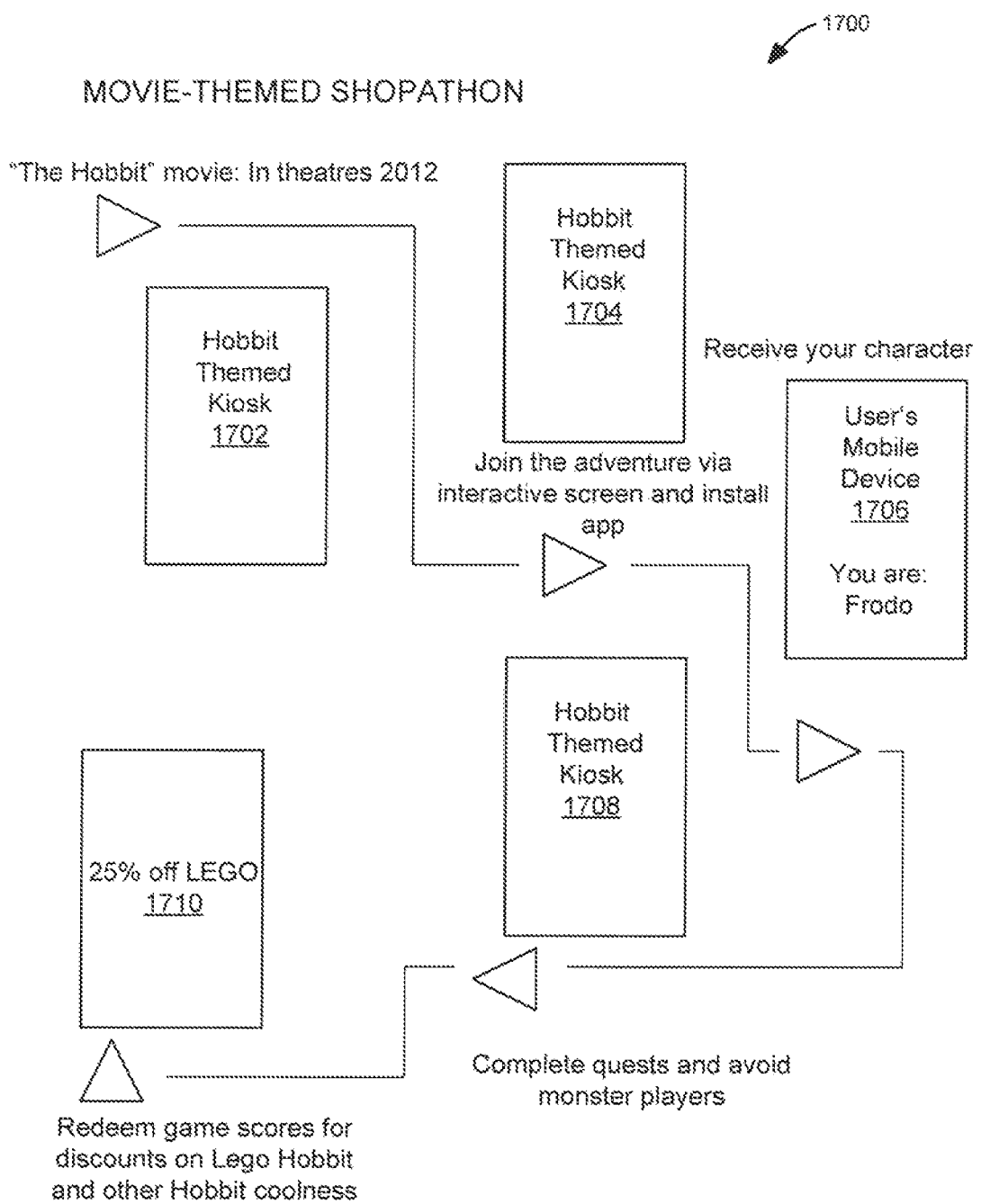
FIG. 17 is a block diagram illustrating a concept for a movie-themed shopathon, according to various embodiments.

FIG. 17 is a block diagram illustrating a concept for a movie-themed shopathon, according to various embodiments. The shopathon may include one or more shopping experience kiosk 110s that the shopper may interact with. For instance, in FIG. 17, the shopper may interact with shopping experience kiosk 110 1702, shopping experience kiosk 110 1704, and shopping experience kiosk 110 1708. The shopper may use a client machine 1706 to interact with each kiosk and also retrieve a coupon 1710 for an item in the shopping area.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations maybe performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 18:
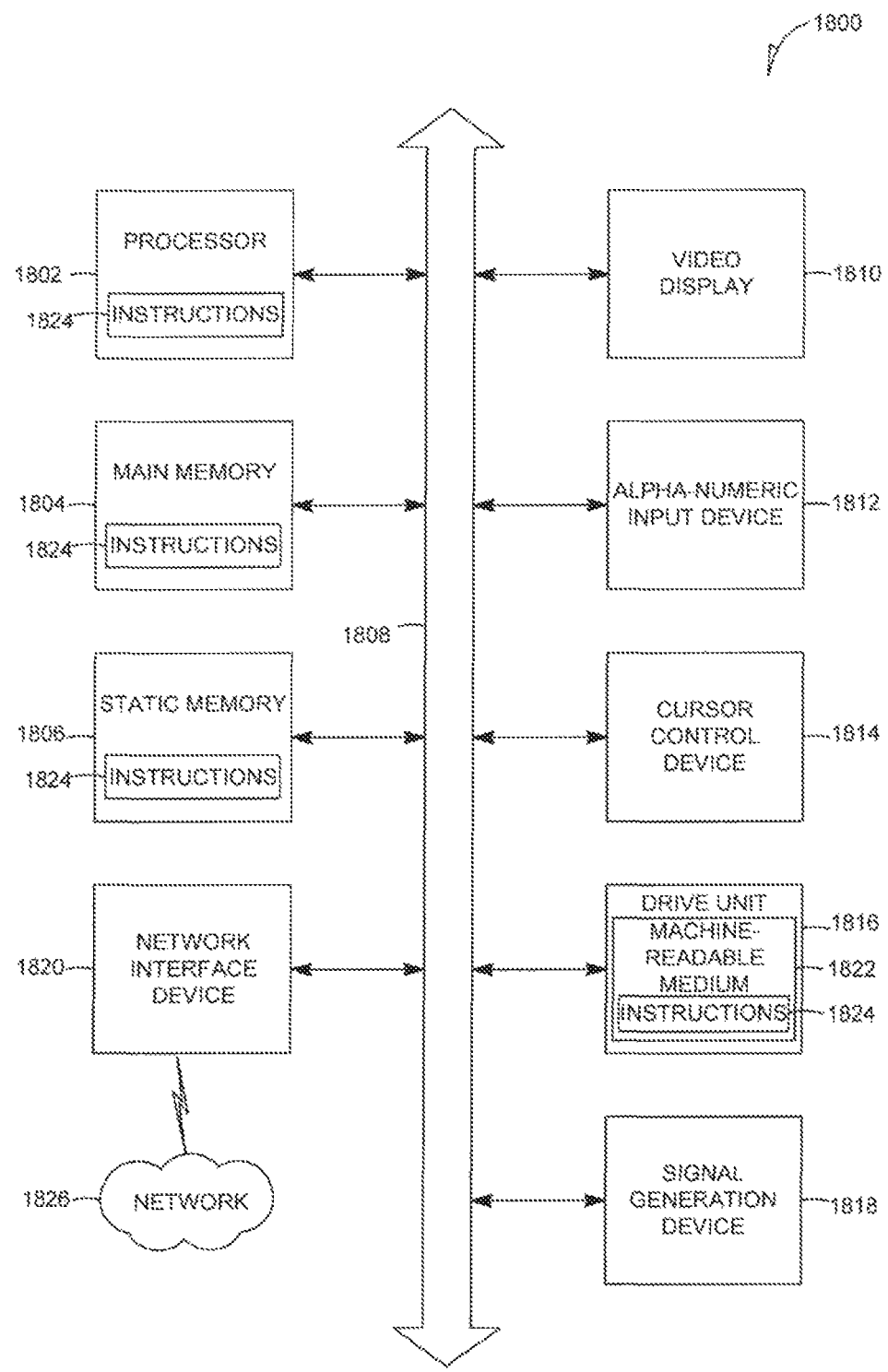
FIG. 18 illustrates an example diagram of a representation of a machine in the example form of a computer system that may be used, according to some embodiments.

FIG. 18 illustrates an example diagram of a representation of a machine in the example form of a computer system 1800 that may be used, according to some embodiments. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard or a touch-sensitive display screen), a user interface (UI) navigation device 1814 (e.g., a mouse), a disk drive unit 1816, a signal generation device 1818 (e.g., a speaker) and a network interface device 1820.

Machine-Readable Medium

The disk drive unit 1816 includes a machine-readable medium 1822 on which is stored one or more sets of instructions and data structures (e.g., software) 1824 embodying or utilized by any one or more of the methodologies or functions described herein. The instructions 1824 may also reside, completely or at least partially, within the main memory 1804 and/or within the processor 1802 during execution thereof by the computer system 1800, the main memory 1804 and the processor 1802 also constituting machine-readable media.

While the machine-readable medium 1822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium, that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a total area network ("LAN"), a wide area network ("WAN"), the Internet, mobile telephone networks, Plain Old Telephone (POTS) networks, and wireless data networks (e.g., Wifi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   one or more processors and executable instructions accessible on a computer-readable medium that, when executed, configured the one or more processors to at least:
   identify a plurality of items assigned to a category inputted by a user, the plurality of items available for sale at a plurality of corresponding locations within a pre-defined geographical area;

receive a selection of at least one item of the plurality of items, the category, or a region within the pre-defined geographical area from a user;

determine a path from a first location of a first brick-and-mortar store that includes a first item of the plurality of items to a second location of a second brick-and-mortar store that includes a second item of the plurality of items, the path being within the pre-defined geographical area where the system is located;

identify discount information for the first item and discount information for the second item;

display the path from the first location to the second location to the user; and provide the discount information for the first item and the discount information for the second item to the user.

2. The system of claim 1, wherein the first location of the path corresponds to a first item selected by the user and the second location of the path corresponds to a second item selected by the user.

3. The system of claim 1, wherein the first location of the path corresponds to a first item assigned to the category selected by the user and the second location of the path corresponds to a second item assigned to the category selected by the user.

4. The system of claim 1, wherein the first location of the path corresponds to a first item identified based in part on a user profile for the user including previous user shopping behavior.

5. The system of claim 1, wherein the second location of the path corresponds to a second item identified based in part on a user profile for the user including previous user shopping behavior.

6. The system of claim 1, wherein the one or more processors are further configured to determine the path based on the region received from the user.

7. The system of claim 1, wherein the one or more processors are further configured to identify the plurality of items based in part on a user profile for the user including user shopping behavior.

8. The system of claim 1, wherein the one or more processors are further configured to send a description of the path to a mobile device of the user.

9. The system of claim 1, wherein the one or more processors are further configured to send the discount information for the first item to a retail location where the first item is sold.

10. The system of claim 1, wherein the one or more processors are further configured to send the discount information for the second item to a retail location where the second item is sold.

11. The system of claim 1, wherein the discount information for the first item and the discount information for the second item are sent to a mobile device of the user as images to be scanned at a retail location.

12. The system of claim 1, wherein the discount information for the first item and the discount information for the second item are displayed to the user as promotional codes.

13. A method comprising:

identifying a plurality of items assigned to a category inputted by a user, the plurality of items available for sale at a plurality of corresponding locations within a pre-defined geographical area;

receiving a selection of at least one item of the plurality of items, the category, or a region within the pre-defined geographical area from a user;

determining, using one or more processors, a path from a first location of a first brick-and-mortar store that includes a first item of the plurality of items to a second location of a second brick-and-mortar store includes a second item of the plurality of items, the path being within the pre-defined geographical area;

identifying discount information for the first item and discount information for the second item; and displaying the path from the first location to the second location to the user, and providing the discount information for the first item and the discount information for the second item to the user.

14. The method of claim 13, wherein the first location of the path corresponds to a first item selected by the user and the second location of the path corresponds to a second item selected by the user.

15. The method of claim 13, wherein the first location of the path corresponds to a first item assigned to the category selected by the user and the second location of the path corresponds to a second item assigned to the category selected by the user.

16. The method of claim 13, wherein the first location of the path corresponds to a first item identified based in part on a user profile for the user including previous user shopping behavior.

17. The method of claim 13, wherein the second location of the path corresponds to a second item identified based in part on a user profile for the user including previous user shopping behavior.

18. The method of claim 13, wherein determining the path from the first location to the second location is based on the region received from the user.

19. The method of claim 13, wherein identifying the plurality of items is based in part on a user profile for the user including user shopping behavior.

20. A non-transitory machine-readable medium storing instructions which, when executed by one or more processors, cause the one or more processors to perform operations comprising:

identifying a plurality of items assigned to a category inputted by a user, the plurality of items available for sale at a plurality of corresponding locations within a pre-defined geographical area;

receiving a selection of at least one item of the plurality of items, the category, or a region within the pre-defined geographical area from a user;

determining a path from a first location of a first brick-and-mortar store that includes a first item of the plurality of items to a second location of a second brick-and mortar store that includes a second item of the plurality of items, the path being within the pre-defined geographical area;

identifying discount information for the first item and discount information for the second item; and displaying the path from the first location to the second location to the user, and providing the discount information for the first item and the discount information for the second item to the user.

* * * * *